United States Patent [19]

Ishida et al.

[11] Patent Number: 5,567,524

[45] Date of Patent: Oct. 22, 1996

[54] MAGNETIC RECORDING MEDIUM HAVING A COBALT THIN FILM MAGNETIC LAYER, CARBON PROTECTIVE LAYER, AND FLUOROLUBRICANT LAYER

[75] Inventors: Toshio Ishida; Masaki Satake; Hideomi Watanabe; Tadashi Yasunaga; Tsutomu Okita, all of Odawara, Japan

[73] Assignee: Fuji Photo Film Co., Ltd., Kanagawa, Japan

[21] Appl. No.: 379,931

[22] Filed: Jan. 27, 1995

[30] Foreign Application Priority Data

Jan. 31, 1994 [JP] Japan ................... 6-009378

[51] Int. Cl.$^6$ ......................................... G11B 5/72
[52] U.S. Cl. ............... 428/408; 428/421; 428/457; 428/694 TC; 428/694 TF; 428/900
[58] Field of Search ................... 428/408, 457, 428/694 TC, 694 TF, 900, 421

[56] References Cited

U.S. PATENT DOCUMENTS

| | | | |
|---|---|---|---|
| 4,621,008 | 11/1986 | Takasugi et al. | 428/216 |
| 4,726,988 | 2/1988 | Oka et al. | 428/307.3 |
| 4,735,848 | 4/1988 | Kondo et al. | 428/219 |
| 5,069,973 | 12/1991 | Saito et al. | 428/421 |
| 5,128,216 | 7/1992 | Ng | 428/695 |
| 5,492,764 | 2/1996 | Okita et al. | 428/457 |
| 5,496,645 | 3/1996 | Ishida et al. | 428/457 |

FOREIGN PATENT DOCUMENTS 0432536  6/1991  European Pat. Off. .

*Primary Examiner*—Stevan A. Resan
*Attorney, Agent, or Firm*—Sughrue, Mion, Zinn, Macpeak & Seas

[57] ABSTRACT

A magnetic recording medium having a ferromagnetic metal thin film formed over at least one surface of a non-magnetic support, wherein the improvement has a lubricant layer consisting essentially of at least one of unsaturated bond-containing fluoroalkyl carboxylic acid esters which are represented by the following formulae (1) to (3):

$$Rf-R_1-COO-R^2 \qquad \text{Formula (1)}$$

$$R^3-COO-R_4-Rf \qquad \text{Formula (2)}$$

$$Rf-R^5-COO-R^6Rf \qquad \text{Formula (3)}$$

where Rf: $(CF_3)_a CF_{3-a}(CF_2)_b$
a: 1 to 3   a+b: 1 to 17

$R^1$ is an alkyl group having from 2 to 18 carbon atoms, or a hydrocarbon group having from 2 to 18 carbon atoms and containing at least one double or triple bond, and $R^2$ is an alkyl group having from 4 to 22 carbon atoms, or a hydrocarbon group having from 4 to 22 carbon atoms and containing at least one double or triple bond. At least either one of $R^1$ and $R^2$ contains at least one double or triple bond. $R^3$ is an alkyl group having from 3 to 21 carbon atoms, and $R^4$ is a hydrocarbon group having from 4 to 18 carbon atoms and containing at least one double or triple bond. $R^5$ and $R^6$ are each an alkyl group having from 2 to 18 carbon atoms, or a hydrocarbon group having from 2 to 18 carbon atoms and containing at least one double or triple bond. At least either one of $R^5$ and $R^6$ contains at least one double or triple bond. $R^5$ and $R^6$ have from 20 to 44 carbon atoms in total.

8 Claims, No Drawings

MAGNETIC RECORDING MEDIUM HAVING A COBALT THIN FILM MAGNETIC LAYER, CARBON PROTECTIVE LAYER, AND FLUOROLUBRICANT LAYER

BACKGROUND OF THE INVENTION

The present invention relates to a magnetic recording medium having a lubricant layer containing an organic fluorine compound over a magnetic layer. More particularly, the present invention relates to a metal thin film type magnetic recording medium which is excellent in running properties, durability and shelf stability.

To improve magnetic properties required for high-density magnetic recording in high-definition broadcasting, digital broadcasting, etc., ferromagnetic metal thin film type magnetic recording mediums formed by vapor deposition or the like have been demanded in place of the conventional coating type magnetic recording mediums. However, in a ferromagnetic metal thin film type magnetic recording medium, a metal layer, which serves as a recording layer, is formed on the surface of the magnetic recording medium, and the metal layer is usually protected with only an extremely thin oxide layer formed on the metal surface. Thus, the ferromagnetic metal thin film type magnetic recording mediums have been demanded to improve markedly in running properties, durability, running durability in repeated use, shelf stability, etc.

Under these circumstances, it has been proposed to coat the surface of the thin film metal layer with various lubricants.

For example, Japanese Patent Application Laid-Open (KOKAI) No. 62-256218 (1987) proposes using a carboxylic acid perfluoroalkyl ester $RCOO(CH_2)_jC_kF_{2k+1}$. Japanese Patent Application Laid-Open (KOKAI) No. 62-236120 (U.S. Pat. No. 4,735,848) discloses a magnetic recording medium provided with a lubricant layer containing a carboxylic acid perfluoroalkyl ester and an extreme pressure agent. Japanese Patent Application Laid-Open (KOKAI) No. 62-236118 (U.S. Pat. No. 4,735,848) discloses a magnetic recording medium provided with a lubricant layer consisting essentially of a carboxylic acid perfluoroalkyl ester and a perfluoro polyether. Japanese Patent Application Laid-Open (KOKAI) No. 62-236119 (U.S. Pat. No. 4,735,848) discloses a magnetic recording medium provided with a lubricant layer consisting essentially of a carboxylic acid perfluoroalkyl ester and a rust preventive. However, all of the carboxylic acid perfluoroalkyl esters, which are principal components of the above-described lubricant layers, are composed of a carboxylic acid of a hydrocarbon system unsaturated fatty acid, and hence readily decomposable. Accordingly, these lubricant layers are unstable under sever conditions, such as high-temperature and high-humidity conditions, and suffer from a large variation of the coefficient of friction.

Japanese Patent Application Laid-Open (KOKAI) No. 62-266728 (1987) discloses a magnetic recording medium that uses a carboxylic acid perfluoroalkoxyalkyl ester $RCOO(CH_2)_nOC_mF_{2m+1}$. The disclosed lubricant is, however, hydrolytic because it has a hydrocarbon group and hence decomposed during storage for a long time, resulting in a failure to exhibit the required lubricating function. Moreover, the decomposition product may impair running properties and durability. Japanese Patent Application Laid-Open (KOKAI) No. 63-9011 (1988) proposes using a perfluorocarboxylic acid perfluoroalkyl ester $C_nF_{2n+1}COO(CH_2)_mC_kF_{2k+1}$. However, the lubricant is unsatisfactory from the viewpoint of the variation of the coefficient of friction and the still durability.

Japanese Patent Application Laid-Open (KOKAI) No. 63-298709 (1988) discloses a technique in which $C_nF_{2n+1}(CH_2)_mX$ (X is OH, COOH, or COOR) is mixed with at least one selected from the group consisting of a higher fatty acid, an ester, and an alcohol. Japanese Patent Application Laid-Open (KOKAI) No. 03-241523 (1991) proposes using RfCOOR (Rf is an alkyl group a part of which is fluorine, and R is an alkyl group having not more than 5 carbon atoms). However, these lubricants are unsatisfactory with regard to running properties at low temperature, suffer from a high coefficient of friction and are lacking in anti-corrosion properties. Accordingly, these conventional magnetic recording layers gather rust during storage for a long time, resulting in the running properties and durability being degraded.

Japanese Patent Application Post-Examination Publication No. 03-19602 (1991) discloses a ferromagnetic metal thin film type magnetic recording medium which uses as a lubricant a fluorine-containing surface-active agent, or a fluorine-containing hydrocarbon having a group, e.g., $SO_3Na$, $SO_3K$, $SO_3H$, etc., more specifically, $C_8F_{17}SO_2F$, or perfluoroalkylpolyoxy ethylene having OH, $SO_3M$, or $RfCONH(CH_2)_3$ (RF is a perfluoroalkyl group) at a terminal thereof, i.e., compounds having a terminal betaine structure. With these fluorine compounds, excellent running properties can be obtained, but still durability and shelf stability are not satisfactory. Moreover, these fluorine compounds are insoluble in a hydrocarbon solvent and therefore need a special solvent, e.g., a fluorine-containing solvent, for coating.

Japanese Patent Application Laid-Open (KOKAI) No. 64-72313 (1989) discloses a technique in which a monomolecular film having the structure of Rf—Rh—X, i.e., perfluoroalkyl group—alkyl group—polar group, is formed on a magnetic layer of a ferromagnetic metal thin film. With this technique, the μ value is improved, but the formation of a monomolecular film by Langmuir Blodgett (LB) process is inferior in productivity and hence impractical. Further, the magnetic recording medium is inferior in still durability and shelf stability, and the solubility of the lubricant in a hydrocarbon solvent is not insufficient.

Japanese Patent Appl icat ion Laid-Open (KOKAI) No. 58-100228 (1983) discloses a lubricant with two chains in which a perfluoroalkyl group and an alkyl group are bonded together, and mentions that the double-chain lubricant $(C_3F_7CH_2CO_2—)$ is applied to a coating type magnetic recording medium. However, it is impossible to expect such a lubricant with a short chain length to satisfactorily lower the coefficient of friction when it is used as a protective layer for a magnetic recording layer of a ferromagnetic metal thin film. In addition, when applied to a ferromagnetic metal thin film type magnetic recording medium, the lubricant suffers from the disadvantages that the corrosiveness is undesirably high, and the coefficient of friction is high. Moreover, it is necessary in order to coat the lubricant to use a coating solution prepared by dissolving the lubricant in a fluorine-containing solvent. Further, since the lubricant itself readily hydrolyzes, the magnetic recording medium using this lubricant cannot be stored for a long period of time.

Japanese Patent Application Laid-Open (KOKAI) No. 62-92227 (1987) discloses a ferromagnetic metal thin film type magnetic recording medium which uses an ammonium salt of Rf(CH$_2$)$_n$COO as a fluorine compound lubricant or uses as a lubricant a compound having a fluoroalkyl group having not less than 3 carbon atoms, an aliphatic alkyl group having not less than 8 carbon atoms, and an OH group. These compounds can be dissolved in isopropanol to prepare a coating solution, and thus are advanced lubricants. However, they are still unsatisfactory in terms of such characteristics as μ value, still durability, and shelf stability, and cannot exhibit excellent characteristics under a wide variety of environmental conditions, particularly, over a wide temperature range of from high temperature to low temperature, or a wide humidity range of from high humidity to low humidity.

It has also been proposed to use perfluoroalkyl polyethers and derivatives thereof as lubricants in addition to the above-described lubricants [for example, see Japanese Patent Application Laid-Open (KOKAI) Nos. 60-61918 (1985), 61-107528 (1986), U.S. Pat. No. 3,778,308, Japanese Patent Application Post-Examination Publication No. 60-10368 (1985), U.S. Pat. No. 4,897,211, etc.]. However, these lubricants of fluorine-containing organic compounds suffer from an undesirably high coefficient of friction occurring between the magnetic layer and a sliding member of a magnetic recording and reproducing apparatus during running at low speed and therefore cannot impart satisfactory running properties to the magnetic layer. The lubricants are also unsatisfactory with regard to shelf stability; the magnetic layer may peel off due to corrosion by an acidic gas, e.g., sulfurous acid gas. Accordingly, no practicable magnetic recording medium can be obtained with these lubricants.

Fatty acids and fatty acid esters [for example, see Japanese Patent Application Post-Examination Publication No. 51-39081 (1976) and Japanese Patent Application Laid-Open (KOKAI) Nos. 56-80828 (1981) and 61-24017 (1986)] suffer from an undesirably high coefficient of friction occurring between the magnetic layer and a magnetic head during running at high speed and are also unsatisfactory with regard to the resistance to corrosion by an acidic gas, e.g., sulfurous acid gas.

Further, most of the above-described lubricants are inferior in solubility in ordinary hydrocarbon-containing organic solvents and soluble in only fluorine-containing organic solvents. Therefore, a fluorine-containing organic solvent must be used to coat a conventional lubricant on a magnetic recording layer as a protective layer. Fluorine-containing organic solvents are costly and causative agents that destroy the ozone layer. Thus, fluorine-containing organic solvents have serious problems from the viewpoint of protecting natural environment, and also suffer from the problem that they have an adverse effect on the manufacturing system and deteriorate the working atmosphere.

The present invention provides a lubricant which is soluble in an ordinary hydrocarbon-containing organic solvent, thereby solving the problems arising from the use of a fluorine-containing solvent, and which imparts running properties, durability and shelf stability to a ferromagnetic metal thin film type magnetic recording medium obtained by vapor deposition, sputtering or the like, whereby the recording density is markedly improved.

It is an object of the present invention to provide a magnetic recording medium, for example, a high-density recording medium, particularly, a metal thin film type magnetic recording medium capable of markedly improving the recording density, which is given excellent running properties, durability, repeated running durability, and shelf stability.

It is another object of the present invention to provide a magnetic recording medium for a cam coder useful for outdoor use.

It is still another object of the present invention to provide a magnetic recording medium capable of exhibiting satisfactory running properties and durability under various environmental conditions, i.e., over a wide temperature range and a wide humidity range.

It is a further object of the present invention to provide a method of producing a magnetic recording medium using a lubricant which is soluble in a hydrocarbon-containing organic solvent so that it is unnecessary to use a fluorine-containing organic solvent, and thus the production method is free from environmental pollution.

SUMMARY OF THE INVENTION

The present invention provides a magnetic recording medium having a ferromagnetic metal thin film formed over at least one surface of a non-magnetic support, wherein the improvement has a lubricant layer consisting essentially of at least one of fluoroalkyl carboxylic acid esters containing an unsaturated bond-containing hydrocarbon chain, which are represented by the following formulae (1) to (3):

| | |
|---|---|
| Rf—R$^1$—COO—R$^2$ | Formula (1) |
| R$^3$—COO—R$^4$—Rf | Formula (2) |
| Rf—R$^5$—COO—R$^6$—Rf | Formula (3) | where Rf: (CF$_3$)$_a$CF$_{3-a}$(CF$_2$)$_b$ a: 1 to 3  a+b: 1 to 17

R$^1$ is an alkyl group having from 2 to 18 carbon atoms, or a hydrocarbon group having from 2 to 18 carbon atoms and containing at least one double or triple bond.

R$^2$ is an alkyl group having from 4 to 22 carbon atoms, or a hydrocarbon group having from 4 to 22 carbon atoms and containing at least one double or triple bond.

At least either one of R$^1$ and R$^2$ contains at least one double or triple bond.

R$^3$ is an alkyl group having from 3 to 21 carbon atoms, and R$^4$ is a hydrocarbon group having from 4 to 18 carbon atoms and containing at least one double or triple bond.

R$^5$ and R$^6$ are each an alkyl group having from 2 to 18 carbon atoms, or a hydrocarbon group having from 2 to 18 carbon atoms and containing at least one double or triple bond. At least either one of R$^5$ and R$^6$ contains at least one double or triple bond. R$^5$ and R$^6$ have from 20 to 44 carbon atoms in total.

In the above-described magnetic recording medium, the ferromagnetic metal thin film may be formed from columnar grains of a material consisting essentially of cobalt which have a diameter less than 35 nm.

In the above-described magnetic recording medium, a carbon protective film may be formed between the ferromagnetic metal thin film and the lubricant layer.

DESCRIPTION OF THE PREFERRED EMBODIMENT

The present invention is a high-density magnetic recording medium with a lubricant layer which has high shelf stability, high running properties and high durability, which cannot be realized with the conventional magnetic recording mediums. The lubricant layer of the magnetic recording medium of the present invention has double bonds introduced into a fluorine-containing ester, thereby lowering the melting point of the ester and making it more fluid, and thus improving the high-speed sliding properties. Moreover, since the double bonds enable the lubricant layer to be effectively adsorbed on the surface of the magnetic layer formed from a ferromagnetic metal thin film, the film will not be broken even during low-speed running, and the coefficient of friction is reduced.

Further, by reducing the diameter of columnar grains constituting the ferromagnetic metal thin film, the number of adsorption points in the magnetic layer which adsorb the double bonds can be increased favorably.

Particularly, the ester constituting the lubricant layer in the present invention has a double or triple bond introduced to the alcohol side thereof or to a site where a fluorine group has been introduced. Therefore, a compound which is not readily decomposable compound can be obtained. In contrast, a fatty acid fluoroalkyl ester such as that shown in Japanese Patent Application Laid-Open (KOKAI) No. 62-256218 uses a fatty acid having an unsaturated bond. Therefore, the ester is readily decomposable, and thus the coefficient of friction deteriorates to a considerable extent during storage for a long time. Although the reason why the compound of the present invention is not readily decomposable is not clear, it is considered that the hydrophobic nature of the neighboring fluorine and the difference in the effect of electronegativity on the unsaturated bond are concerned with the advantageous feature of the compound of the present invention. Further, the compound of the present invention is effectively adsorbed on the ferromagnetic metal thin film or the carbon protective film by an unsaturated bond, and it is not acid. Accordingly, the compound gives rise to no problem in regard to the corrosion of a magnetic head contacted by the magnetic recording medium. Thus, favorable results can be obtained.

In the magnetic recording medium of the present invention, the lubricant layer consists essentially of at least one of fluoroalkyl carboxylic acid esters containing an unsaturated bond-containing hydrocarbon chain, which are represented by the following formulae (1) to (3):

$$Rf—R^1—COO—R^2 \quad \text{Formula (1)}$$

$$R^3—COO—R^4—Rf \quad \text{Formula (2)}$$

$$Rf—R^5—COO—R^6—Rf \quad \text{Formula (3)}$$

where Rf: $(CF_3)_a CF_{3-a}(CF_2)_b$
a: 1 to 3
a+b: 1 to 17, more preferably 1 to 11

Preferably, $R^1$, $R^5$ and $R^6$ are each an alkyl group having from 2 to 12 carbon atoms, or a hydrocarbon group having from 2 to 12 carbon atoms and containing at least one double or triple bond. $R^2$ is preferably an alkyl group having from 12 to 18 carbon atoms, or a hydrocarbon group having from 12 to 18 carbon atoms and containing at least one double or triple bond. $R^3$ is preferably an alkyl group having from 11 to 17 carbon atoms, and $R^4$ is preferably a hydrocarbon group having from 2 to 12 carbon atoms and containing at least one double or triple bond. $R^1$, $R^2$, $R^3$, $R^4$, $R^5$ and $R^6$ may be branched.

If Rf exceeds the upper limit of the above range, the solubility of the compound in a solvent becomes insufficient, and satisfactory running properties cannot be obtained. If Rf is smaller than the lower limit of the above range, durability, particularly still durability becomes insufficient.

If $R^2$ or $R^3$ is smaller than the lower limit of the above range, the volatility of the compound rises undesirably, and durability, particularly still durability becomes insufficient.

If $R^2$ or $R^3$ exceeds the upper limit of the above range, the adsorptivity of the compound lowers, and the coefficient of friction rises. If $R^1$, $R^4$, $R^5$ or $R^6$ exceeds the upper limit of the above range, durability deteriorates unfavorably. Particularly, the output lowers to a considerable extent.

If $R^1$, $R^4$, $R^5$ or $R^6$ is smaller than the lower limit of the above range, the solubility of the compound in a solvent becomes insufficient, or the volatility rises undesirably. Thus, satisfactory characteristics cannot be exhibited.

A fluoroalkyl carboxylic acid ester containing a double bond as described above can be readily obtained by synthesizing a corresponding carboxylic acid chloride and an alcohol containing or not containing fluorine in the presence of a base such as triethylamine and purifying the resulting ester by vacuum distillation or recrystallization.

Further, the magnetic recording medium of the present invention may use a lubricant which consists essentially of a double bond-containing fluoroalkyl carboxylic acid ester of the formula (1), (2) or (3) in combination with a compound having at least one selected from the group consisting of COOH, $SO_3M$, a phosphoric acid group, and a phosphorous acid group and at least one selected from the group consisting of an alkyl group, a perfluoroalkyl group, and a perfluoroalkyl alkyl group, which has 10 or more carbon atoms in total. The use of such a combination enables the lowering of the output to be further reduced and makes it possible to obtain a magnetic recording medium capable of maintaining excellent electromagnetic transducing characteristics even when it is repeatedly run.

The magnetic recording medium of the present invention can be further improved in running properties and durability by providing a back coat layer of a coating film consisting essentially of a non-magnetic powder and a binding resin on the surface of a non-magnetic support on the side reverse to the side where the magnetic layer is formed.

Since the ferromagnetic metal thin film can retain only a limited amount of lubricant on the surface or inside thereof, if the back coat layer has previously been impregnated with the lubricant, a deficiency of lubricant can be filled with the lubricant supplied from the back coat layer, advantageously. More specifically, when the tape-shaped magnetic recording medium is wound up, the back coat layer and the magnetic layer come in contact with each other, thereby enabling the lubricant to be supplied to the magnetic layer.

As a non-magnetic powder for forming a back coat layer, various kinds of inorganic pigment and carbon black can be used. As a binding resin, it is possible to use various kinds of binding resin which are generally employed for coating type magnetic layers, e.g., nitrocellulose, vinyl chloride resin, polyurethane, etc.

As a non-magnetic support for the magnetic recording medium of the present invention, a synthetic resin film having a thickness of 5 μm to 15 μm is preferably used. Examples include polyethylene terephthalate, polyethylene naphthalate, polyamide, and polyimide.

The magnetic layer of the magnetic recording medium of the present invention is preferably formed from a ferromagnetic metal thin film of a metal, e.g., iron, nickel, cobalt, etc., or an alloy of such a metal. The thickness of the magnetic layer is preferably in the range of from 0.1 μm to 0.3 μm. It is particularly preferable that the magnetic layer should be formed in a single-layer structure, a parallel multilayer structure or a non-parallel multilayer structure, which contains not less than 90 at. % cobalt and the rest of which contains nickel, chromium, etc. Vapor deposition, sputtering, etc. may be employed as a magnetic layer forming method. A magnetic layer formed by vapor deposition in the presence of oxygen is particularly preferable.

Metal grains formed as a ferromagnetic metal thin film in the present invention are required to have a diameter not larger than 35 nm. It is preferable that the initial regulation angle of the stream of metal vapor during vapor deposition should be set in the range of from 50° to 80°, and the rate of introduction of oxygen should be set in the range of from 350 ml/min. to 550 ml/min.

If the angle is larger than the upper limit of the above range, or the oxygen introduction rate is smaller than the lower limit of the above range, the above-described grain diameter cannot be obtained. If the oxygen introduction rate exceeds the upper limit of the above range, the thickness of the oxide film becomes so large that no playback output can be obtained.

If the angle is smaller than the lower limit of the above range, the grain growth becomes insufficient, so that the resulting film is brittle. Thus, the durability reduces.

By specifying the angle and the oxygen introduction rate as described above, the direction of grain growth varies, and many crystal faces which are readily contributable to adsorption by double bonds are grown.

The magnetic recording medium of the present invention can be further improved in running durability by providing a carbon protective film, which can be obtained by various film forming methods, on the ferromagnetic metal thin film.

Particularly, in the present invention, it is considered that the π-bonds of unsaturated bonds in the compound represented by one of the formulae (1) to (3) provide even more firm adsorption to a carbon protective film, which similarly has a large number of π-bonds. Therefore, provision of a carbon protective film gives a more powerful effect than that of the carbon protective films which have heretofore been known.

The carbon protective film may be formed by a method, for example, ionized cluster beam evaporation, plasma CVD, sputtering, photo-assisted CVD, ion beam method, ECR plasma CVD, etc.

With regard to the structure of the carbon protective film, it is preferable to form a rigid carbon film which is generally known as "diamond-shaped carbon". If the diamond-shaped carbon film is excessively thin, durability becomes insufficient, whereas, if the film is excessively thick, thickness loss is produced at the magnetic head during recording or playback. Therefore, the film thickness is preferably in the range of from 5 nm to 25 nm, particularly preferably from 8 nm to 20 nm, and even more preferably from 8 nm to 15 nm. The diamond-shaped carbon film can be formed by an ion beam method, ionized cluster beam evaporation, plasma CVD, sputtering, ion plating, photo-assisted CVD, ECR plasma CVD, etc.

To form a carbon protective film by plasma CVD, a film-forming gas is sprayed on the ferromagnetic metal thin film. In this case, the film-forming gas is formed into a plasma by a plasma generating apparatus and then sprayed on the ferromagnetic metal thin film by a gas pressure difference and an electric potential difference.

There is no particular restriction on the material used to form a carbon protective film, that is, the film-forming gas that is formed into a plasma. However, examples of preferable materials are hydrocarbon, ketone and alcohol gases. In general, such a film-forming gas is introduced into the plasma generating apparatus at a partial pressure in the range of from 13.3 N/m² to 0.133 N/m², preferably from 6.67 N/m² to 2.67 N/m². It is preferable to introduce the gas in the form of a mixture of a hydrocarbon such as methane and argon. In general, the ratio of hydrocarbon to argon is preferably in the range of from 6:1 to 2:1.

It is particularly preferable to apply the compound of the present invention by coating or other similar method to a carbon protective film after it has been formed by plasma CVD using as a raw material a carbon-containing compound such as an alkane, e.g., methane, ethane, propane, butane, etc., or an alkene, e.g., ethylene, propylene, etc., or an alkyne, e.g., acetylene.

Further, the magnetic recording medium of the present invention can be improved in the characteristics required therefor by containing a rust preventive consisting essentially of a tetrazinedene cyclic compound and/or a thiouracil cyclic compound, a benzotriazole compound, or a thiobenzimidazole compound.

Examples of tetrazinedene cyclic compounds usable for this purpose are those which are represented by the following formula:

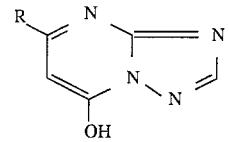

where R is a hydrocarbon group selected from the group consisting of an alkyl group, an alkoxy group, and an alkylamide group.

Tetrazinedene cyclic compounds having from 3 to 26 carbon atoms are particularly preferable. In the case of an alkoxy group, R in ROCOCH$_2$— may be C$_3$H$_7$—, C$_6$H$_{13}$—, or phenyl. In the case of an alkyl group, R may be C$_6$H$_{13}$—, C$_9$H$_{19}$—, or C$_{17}$H$_{35}$—. In the case of an alkylamide group, R in RNHCOCH$_2$ may be phenyl, or C$_3$H$_7$—.

Examples of thiouracil cyclic compounds are those which are represented by the following formula:

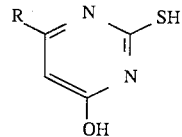

where R is a hydrocarbon group having 3 or more carbon atoms.

The lubricant and the rust preventive may be coated simultaneously in the form of a mixture. However, an effective way of coating is to coat the rust preventive in advance of the lubricant. These materials may be coated by an ordinary coating method using a coil bar, for example, in the form of a solution in an organic solvent. The rust preventive may be impregnated into the back coat layer so that it is transferred to the magnetic layer from the back coat layer when the magnetic recording medium is wound up.

It is an effective way of improving running durability to provide fine protrusions on the surface of the non-magnetic support before the formation of the ferromagnetic metal thin film because appropriate unevenness is consequently provided on the surface of the magnetic layer. The density of fine protrusions to be provided on the surface of the non-magnetic support is preferably 2×10$^6$ to 2×10$^8$ protrusions/mm², and the height of each protrusion is preferably 1 nm to 50 nm.

It is also possible to use another lubricant in combination with the lubricant of an organic fluorine-containing compound according to the present invention. Examples of a lubricant jointly used in the present invention include a perfluoro polyether represented by the following formula, and compounds obtained by modifying the terminal of the perfluoro polyether with OH, COOH, etc.:

$$CF_3-(CFRfCF_2-O)_n-CF_2CF_3$$

Rf in the above formula is $CF_3$ or F, and the molecular weight is in the range of from 1,000 to 20,000, preferably from 2,500 to 10,000. Specific examples are KRYTOX K143AZ and K157FSL, manufactured by Du Pont Co., Ltd., FOMBLIN AM2001, manufactured by Montefluos, DEMNUMSY, manufactured by Daikin Kogyo Co., Ltd., and so forth.

The coating weight of the lubricant in the magnetic recording medium of the present invention is preferably in the range of from 1.0 to 50 mg/m$^2$, particularly preferably from 3 to 30 mg/m$^2$.

The lubricant used for the magnetic recording medium of the present invention is dissolved in an organic solvent, and the resulting solution is coated on the surface of the magnetic layer by an ordinary coating method using a coil bar, for example. Since the fluorine-containing compound of the present invention is soluble in at least one ordinary hydrocarbon solvent selected from the group consisting of acetone, methyl ethyl ketone, methyl isobutyl ketone, cyclohexanone, methanol, ethanol, and isopropanol, it can be coated and dried to produce a magnetic recording medium without using a fluorine-containing organic solvent.

The magnetic recording medium of the present invention has a lubricant layer consisting essentially of a fluoroalkyl carboxylic acid ester containing an unsaturated bond-containing hydrocarbon chain. The lubricant layer has double bonds introduced into the fluorine-containing ester, thereby lowering the melting point of the ester and making it more fluid, and thus improving the high-speed sliding properties. Moreover, since the double bonds enable the lubricant layer to be effectively adsorbed on the surface of the magnetic layer formed from a ferromagnetic metal thin film, the film will not be broken even during low-speed running, and the coefficient of friction is reduced. Since the adsorption is bonding in which the π-bonds of double bonds take part, the lubricant exhibits even more powerful effect when it is used in combination with a carbon protective film having many π-bonds in the ground. Unlike hydrocarbon system unsaturated fatty acid esters, the ester of the present invention is not readily decomposable, and thus a magnetic recording medium which is excellent in shelf stability, running properties and durability can be obtained.

The present invention will be described below more specifically by way of examples.

Examples and Comparative Examples

A cobalt-nickel magnetic film was deposited on a polyethylene terephthalate film of 7 μm in thickness and 100 mm in width by oblique-incidence vapor deposition to form a ferromagnetic metal thin film layer of 150 nm in thickness. The vapor deposition was carried out as follows: As a vacuum pump, an oil diffusion pump [PF22, manufactured by Nihon Shinku (K.K.)] was used. The distance from the oxygen inlet port to the polyethylene terephthalate film as a non-magnetic support was set to 50 mm. Then, a cobalt-nickel alloy (Co: 90 wt %; and Ni: 10 wt %) was evaporated by an electron beam, and oblique-incidence vapor deposition was performed such that the angle of the vapor stream with respect to the non-magnetic support changed from 30° to each of the incidence angles shown in Table 1 below, with oxygen gas being introduced under a vacuum of 6.7×10$^{-3}$ N/m$^2$, thereby obtaining magnetic layer Nos. 1 to 10. The columnar grain diameter of each magnetic layer was measured with a scanning electron microscope (S-900, manufactured by Hitachi, Ltd.). The results of the measurement are shown in Table 1. In the meantime, a carbon protective film of 8 nm in thickness was formed on the magnetic layer Nos. 1 and 4 by plasma CVD using methane as a raw material. As the RF power, 400 W was applied to produce a plasma. The plasma was accelerated by applying a DC voltage of −400 V to the magnetic layer surface through a pass roller and further applying a DC voltage of +500 V to an anode installed in the gas inlet, thereby forming a carbon protective film on the surface of each magnetic layer. The magnetic layers obtained in this way were designated as magnetic layer Nos. 11 and 12.

TABLE 1

| Magnetic layer Nos. | Oxygen introduction rate (ml/min) | Incidence angle (degree) | Diameter of columnar grains (nm) |
|---|---|---|---|
| 1 | 400 | 90 | 40 |
| 2 | 400 | 80 | 37 |
| 3 | 400 | 70 | 34 |
| 4 | 400 | 60 | 31 |
| 5 | 400 | 50 | 28 |
| 6 | 350 | 60 | 43 |
| 7 | 350 | 60 | 37 |
| 8 | 500 | 60 | 32 |
| 9 | 550 | 60 | 30 |
| 10 | 550 | 50 | 27 |

Each of the lubricants shown in Tables 2 to 4 was coated on each magnetic recording medium thus obtained using a coil bar and then dried. Then, a back coat layer was formed on the surface of the non-magnetic support on the side reverse to the side where the magnetic layer was formed by using a back coat layer coating solution having the following composition. Then, the magnetic recording medium was slit into a tape of 8 mm in width, thus preparing a magnetic recording tape as a sample.

| (Back coat layer coating solution) | |
|---|---|
| Carbon black Particle size: 18 nm | 100 parts by weight |
| Nitrocellulose RS1/2H (manufactured by Daicel Ltd.) | 60 parts by weight |
| Polyurethane N-2304 (manufactured by Nippon Polyurethane Co., Ltd.) | 60 parts by weight |
| Polyisocyanate Coronate L (manufactured by Nippon Polyurethane Co., Ltd.) | 20 parts by weight |
| Methyl ethyl ketone | 1,000 parts by weight |
| Toluene | 1,000 parts by weight |

Then, each of the prepared magnetic tapes was evaluated by the following methods. The results of the evaluation are shown in Tables 2 to 4. In the tables, "(Comp)" attached to sample Nos. denotes a comparative example.

Evaluation Method

① Measurement of coefficient of friction

Each sample of magnetic tape thus obtained was brought into contact with a stainless steel pole at a winding angle of 180° under a tension ($T_1$) of 50 g. A tension ($T_2$) required for running the sample at a speed of 3.3 cm/sec. under the above-described condition was measured. The magnetic tape was repeatedly run 100 times, and the friction coefficient μ of the magnetic tape in the 100-th running pass was determined from the following formula on the basis of the measured value:

$$\mu = 1/\mu \cdot \ln(T_2/T_1)$$

The measurement of the friction coefficient μ was carried out at 60° C. and 80% RH under two different conditions: A) before storage; and B) after storage for 7 days at 60° C. under dry condition.

Further, variation of the friction coefficient during running was measured.

○ indicates that the friction coefficient variation was 0.03 or less.

Δ indicates that the friction coefficient variation was between 0.03 and 0.06.

× indicates that the friction coefficient variation was 0.06 or more.

② Measurement of still durability

Each sample tape was subjected to video recording by using an 8-mm VTR (Hi8 $FH_{125}SW$, a product of Fuji Photo Film Co., Ltd.). Then, the recorded image was reproduced in the still playback mode with the still playback limiting mechanism left inoperative, and a time taken until the playback output reached -6 dB with respect to the initial output was measured to evaluate the still durability.

The test for the still durability was carried out at 5° C. and 10% RH under two different conditions: A) before storage; and B) after storage for 7 days at 60° C. and 90% RH.

③ Corrosion of head

Each sample tape was brought into contact with a thin-film head (MR head for DCC, manufactured by Matsushita Electric Industrial Co., Ltd.) and stored in this state for 3 days at 60° C. and 80% RH. Corrosion of the head after the storage was observed with an optical microscope with a magnifying power of 200, and the condition of head corrosion was evaluated according to the following evaluation criteria.

○: no corrosion was observed on the head surface

×: corrosion was observed on the entire portion of the head surface which had been contacted by the tape

TABLE 2

| Sample Nos. | Magnetic layer | Chemical structure of coating material | Coating weight mg/m² | Measuring condition | μ-value & variation thereof | Still durability (min) | Head corrosion |
|---|---|---|---|---|---|---|---|
| 1 | 4 | $CF_3(CF_2)_7C_2H_4COOC_8H_{16}CH=CHC_8H_{16}$ | 10 | A | 0.22 ○ | >60 | ○ |
|   |   |   |   | B | 0.26 ○ | >60 |   |
| 2 | 4 | $CH_3(CH_2)_2COO(CH_2)_{10}CH=CH(CF_2)_7CF_3$ | 10 | A | 0.27 ○ | >60 | ○ |
|   |   |   |   | B | 0.27 ○ | >60 |   |
| 3 | 4 | $CF_3(CF_2)_3(CH_2)_{10}COO-(CH_2)_3CH=CH(CH_2)_2CH_3$ | 10 | A | 0.24 ○ | >60 | ○ |
|   |   |   |   | B | 0.25 ○ | >60 |   |
| 4 | 4 | $(CF_3)_2CF(CF_2)_8(CH_2)_{10}COO-(CH_2)_{10}CH=CH(CF_2)_9CF_3$ | 10 | A | 0.22 ○ | >60 | ○ |
|   |   |   |   | B | 0.22 ○ | >60 |   |
| 5 | 4 | $(CF_3)_2CF(CH_2)_3CH=CH(CH_2)_3COO-(CH_2)_2(CF_2)_5CF_3$ | 10 | A | 0.20 ○ | >60 | ○ |
|   |   |   |   | B | 0.21 ○ | >60 |   |
| 6 | 4 | $CF_3(CF_2)_7CH=CH(CH_2)_5COO-(CH_2)_2(CF_2)_{16}CF_3$ | 10 | A | 0.29 ○ | 58 | ○ |
|   |   |   |   | B | 0.31 ○ | 56 |   |
| 7 | 4 | $CH_3(CH_2)_{16}COO(CH_2)_3CH=CH-(CH_2)_3(CF_2)_9CF_3$ | 10 | A | 0.21 ○ | >60 | ○ |
|   |   |   |   | B | 0.22 ○ | >60 |   |
| 8 | 4 | $(CF_3)_2CF(CF_2)_8(CH_2)_2COO(CH_2)_8-CH=CHCH_2CH=CH(CH_2)_4CH_3$ | 10 | A | 0.25 ○ | >60 | ○ |
|   |   |   |   | B | 0.22 ○ | >60 |   |
| 9 | 4 | $(CF_3)_2CF(CH_2)_{10}COO(CH_2)_{16}-CH=CH(CF_2)_6CF(CF_3)_2$ | 10 | A | 0.24 ○ | >60 | ○ |
|   |   |   |   | B | 0.25 ○ | >60 |   |
| 10 | 4 | $CF_3(CF_2)_6(CH_2)_6COO(CH_2)_6-CH=CH(CF_2)_4CF(CF_3)_2$ | 15 | A | 0.21 ○ | >60 | ○ |
|   |   |   |   | B | 0.21 ○ | >60 |   |

TABLE 2-continued

| Sample Nos. | Magnetic layer | Chemical structure of coating material | Coating weight mg/m² | Measuring condition | μ-value & variation thereof | Still durability (min) | Head corrosion |
|---|---|---|---|---|---|---|---|
| 11 | 4 | 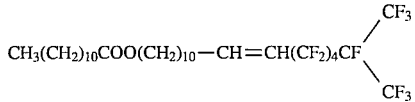 | 5 | A | 0.23 ○ | >60 | ○ |
|   |   |   |   | B | 0.24 ○ | 59 |   |

TABLE 3

| Sample Nos. | Magnetic layer | Chemical structure of coating material | Coating weight mg/m² | Measuring condition | μ-value & variation thereof | Still durability (min) | Head corrosion |
|---|---|---|---|---|---|---|---|
| 12 | 1 | $CF_3(CF_2)_6(CH_2)_3CH=CH(CH_2)_3-COO(CH_2)_8CH=CH(CH_2)_7CH_3$ | 10 | A | 0.31 △ | 55 | ○ |
|   |   |   |   | B | 0.31 △ | 49 |   |
| 13 | 2 | " | 10 | A | 0.27 △ | 58 | ○ |
|   |   |   |   | B | 0.28 △ | 55 |   |
| 14 | 3 | " | 10 | A | 0.23 ○ | >60 | ○ |
|   |   |   |   | B | 0.23 ○ | 58 |   |
| 15 | 4 | " | 10 | A | 0.21 ○ | >60 | ○ |
|   |   |   |   | B | 0.22 ○ | >60 |   |
| 16 | 5 | " | 10 | A | 0.20 ○ | >60 | ○ |
|   |   |   |   | B | 0.21 ○ | >60 |   |
| 17 | 6 | " | 10 | A | 0.31 ○ | 53 | ○ |
|   |   |   |   | B | 0.32 ○ | 46 |   |
| 18 | 7 | " | 10 | A | 0.27 ○ | 59 | ○ |
|   |   |   |   | B | 0.27 ○ | 56 |   |
| 19 | 8 | " | 10 | A | 0.24 ○ | >60 | ○ |
|   |   |   |   | B | 0.24 ○ | >60 |   |
| 20 | 9 | " | 10 | A | 0.22 ○ | >60 | ○ |
|   |   |   |   | B | 0.22 ○ | >60 |   |
| 21 | 10 | " | 10 | A | 0.19 ○ | >60 | ○ |
|   |   |   |   | B | 0.19 ○ | 58 |   |
| 22 | 11 | " | 10 | A | 0.21 ○ | >60 | ○ |
|   |   |   |   | B | 0.21 ○ | >60 |   |
| 23 | 12 | " | 10 | A | 0.18 ○ | >60 | ○ |
|   |   |   |   | B | 0.18 ○ | >60 |   |
| 24 (Comp) | 4 | $CH_3(CH_2)_7CH=CH(CH_2)_7COO-(CH_2)_2(CF_2)_7CF_3$ | 10 | A | 0.31 △ | 42 | ○ |
|   |   |   |   | B | 0.50 X | 13 |   |

TABLE 4

| Sample Nos. | Magnetic layer | Chemical structure of coating material | Coating weight mg/m² | Measuring condition | μ-value & variation thereof | Still durability (min) | Head corrosion |
|---|---|---|---|---|---|---|---|
| 25 (Comp) | 4 | $CF_3(CF_2)_7(CH_2)_{10}COOH$ | 10 | A | 0.31 △ | 1 | X |
|   |   |   |   | B | 0.31 △ | 2 |   |
| 26 (Comp) | 4 | $CF_3(CF_2)_7COO(CH_2)_{17}CF_3$ | 10 | A | 0.41 △ | 10 | ○ |
|   |   |   |   | B | 0.46 △ | 12 |   |
| 27 (Comp) | 4 | $C_{17}H_{35}COO(CH_2)_2(CF_2)_5CF_3$ | 10 | A | 0.23 ○ | >60 | ○ |
|   |   |   |   | B | 0.23 ○ | >58 |   |
| 28 | 4 | $CF_3(CF_2)_8(CH_2)_2COO(CH_2)_{10}C\equiv CH_2$ | 10 | A | 0.20 ○ | >60 | ○ |
|   |   |   |   | B | 0.21 ○ | >60 |   |

As has been described above, the magnetic recording medium of the present invention uses a lubricant having a double bond introduced to the alcohol side of an alkylene oxide-containing fluoroalkyl ester or to a site of the carboxylic acid where a fluorine group has been introduced. Thus, the ester constituting the lubricant layer of the present invention is not readily decomposable in contrast to esters having an unsaturated fatty acid. Further, the melting point of the fluorine-containing ester is lowered and made more fluid, thereby improving the high-speed sliding properties. Moreover, since the double bonds enable the lubricant layer to be effectively adsorbed on the surface of the magnetic layer formed from a ferromagnetic metal thin film, the film will not be broken even during low-speed running, and the coefficient of friction is reduced. Particularly, the adsorption to the carbon protective film formed on the surface of the ferromagnetic metal thin film is enhanced, and thus a magnetic recording medium which is excellent in shelf stability and durability can be obtained.

What we claim is:

1. A magnetic recording medium having a ferromagnetic metal thin film formed over at least one surface of a non-magnetic support, wherein the ferromagnetic metal thin film is formed from columnar grains of a material consisting essentially of cobalt which have a diameter less than 36 nm, and a carbon protective film is formed on said ferromagnetic metal thin film, said magnetic recording medium further comprising a lubricant layer consisting essentially of at least one of fluoroalkyl carboxylic acid esters containing an unsaturated bond-containing hydrocarbon chain, which are represented by one of the following formulae (1) to (3):

   Formula (1)

   Formula (2)

   Formula (3)

where Rf: $(CF_3)_a CF_{3-a}(CF_2)_b$ a: 1 to 3  a+b: 1 to 17

$R^1$ is an alkyl group having from 2 to 18 carbon atoms, or a hydrocarbon group having from 2 to 18 carbon atoms and containing at least one double or triple bond;

$R^2$ is an alkyl group having from 4 to 22 carbon atoms, or a hydrocarbon group having from 4 to 22 carbon atoms and containing at least one double or triple bond;

at least either one of $R^1$ and $R^2$ contains at least one double or triple bond;

$R^3$ is an alkyl group having from 3 to 21 carbon atoms, and $R^4$ is a hydrocarbon group having from 4 to 18 carbon atoms and containing at least one double or triple bond; and $R^5$ and $R^6$ are each an alkyl group having from 2 to 18 carbon atoms, or a hydrocarbon group having from 2 to 18 carbon atoms and containing at least one double or triple bond, at least either one of $R^5$ and $R^6$ containing at least one double or triple bond, and $R^5$ and $R^6$ having from 20 to 44 carbon atoms in total;

and wherein the lubricant layer further contains a rust preventive which is a tetrazinedene cyclic compound represented by the following formula:

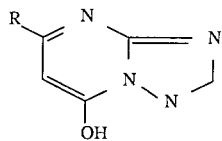

where R is a hydrocarbon group selected from the group consisting of an alkyl group, an alkoxy group, and an alkylamide group.

2. A magnetic recording medium comprising a ferromagnetic metal thin film formed over at least one surface of a non-magnetic support, wherein the ferromagnetic metal thin film is formed from columnar grains of a material consisting essentially of cobalt which have a diameter less than 35 nm, and a carbon protective film is formed on said ferromagnetic metal thin film, said magnetic recording medium further comprising a lubricant layer consisting essentially of at least one of fluoroalkyl carboxylic acid esters containing an unsaturated bond-containing hydrocarbon chain, which are represented by the following one of the following formulae (1) to (3):

   Formula (1)

   Formula (2)

   Formula (3)

where Rf: $(CF_3)_a CF_{3-a}(CF_2)_b$, a: 1 to 3 a+b: 1 to 17

$R^1$ is an alkyl group having from 2 to 18 carbon atoms, or a hydrocarbon group having from 2 to 18 carbon atoms and containing at least one double or triple bond;

$R^2$ is an alkyl group having from 4 to 22 carbon atoms, or a hydrocarbon group having from 4 to 22 carbon atoms and containing at least one double or triple bond;

at least either one of $R^1$ and $R^2$ contains at least one double or triple bond;

$R^3$ is an alkyl group having from 3 to 21 carbon atoms, and $R^4$ is a hydrocarbon group having from 4 to 18 carbon atoms and containing at least one double or triple bond; and $R^5$ and $R^6$ are each an alkyl group having from 2 to 18 carbon atoms, or a hydrocarbon group having from 2 to 18 carbon atoms, containing at least one double or triple bond, at least either one of $R^5$ and $R^6$ containing at least one double or triple bond, $R^5$ and $R^6$ having from 20 to 44 carbon atoms in total and wherein the lubricant layer further contains as a rust preventive a thiouracil cyclic compound represented by the following formula:

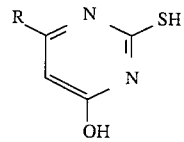

where R is a hydrocarbon group having 3 or more carbon atoms.

3. A magnetic recording medium according to claim 1, wherein the fluoroalkyl carboxylic acid ester is represented by Formula (1).

4. A magnetic recording medium according to claim 1, wherein the fluoroalkyl carboxylic acid ester is represented by Formula (2).

5. A magnetic recording medium according to claim 1, wherein the fluoroalkyl carboxylic acid ester is represented by Formula (3).

6. A magnetic recording medium according to claim 2, wherein the fluoroalkyl carboxylic acid ester is represented by Formula (1).

7. A magnetic recording medium according to claim 2, wherein the fluoroalkyl carboxylic acid ester is represented by Formula (2).

8. A magnetic recording medium according to claim 2, wherein the fluoroalkyl carboxylic acid ester is represented by Formula (3).

* * * * *